United States Patent [19]

Frank et al.

[11] 4,040,266

[45] Aug. 9, 1977

[54] MULTISTAGE COOLING OF CRUDE HYDROCARBON GASES

[75] Inventors: Horst Frank, Baierbrunn; Hans Peter Langebach, Pullach, both of Germany

[73] Assignee: Linde Aktiengesellschaft, Wiesbaden, Germany

[21] Appl. No.: 715,674

[22] Filed: Aug. 19, 1976

[30] Foreign Application Priority Data

Aug. 23, 1975 Germany .......................... 2538611

[51] Int. Cl.$^2$ .............................................. F28C 1/00
[52] U.S. Cl. .............................................. 62/121
[58] Field of Search .................... 62/95, 113, 121, 335

[56] References Cited

U.S. PATENT DOCUMENTS

| | | | |
|---|---|---|---|
| 2,126,266 | 8/1938 | Laird ........................................ | 62/121 |
| 2,157,318 | 5/1939 | Baehr et al. .............................. | 62/121 |
| 2,316,744 | 4/1943 | Mellett et al. ........................... | 62/121 |
| 2,760,356 | 8/1956 | Sixsmith ................................... | 62/113 |
| 3,095,295 | 6/1963 | Colton ..................................... | 62/121 |

*Primary Examiner*—Lloyd L. King
*Attorney, Agent, or Firm*—Millen & White

[57] ABSTRACT

Crude gas, such as cracking gas, is subjected after quenching to a two stage cooling system wherein water is employed in the first stage as both a direct contact coolant and scrubbing agent to remove condensed out hydrocarbons and solids from the gas. The scrubbing liquid in the first stage is subjected to a rough decanting step to separate hydrocarbons from water which is to be recycled; however, no indirect heat exchangers are used for recycle water, thereby avoiding clogging. The gas recovered from the first cooling stage is at about the water dew point of the gas, and is then cooled in a second stage in direct contact with refrigerated water, but because the fouling substances of the gas are removed in the first stage, there is no clogging problem when the recycle water is cooled in an indirect heat exchanger with an external refrigerant.

7 Claims, 1 Drawing Figure

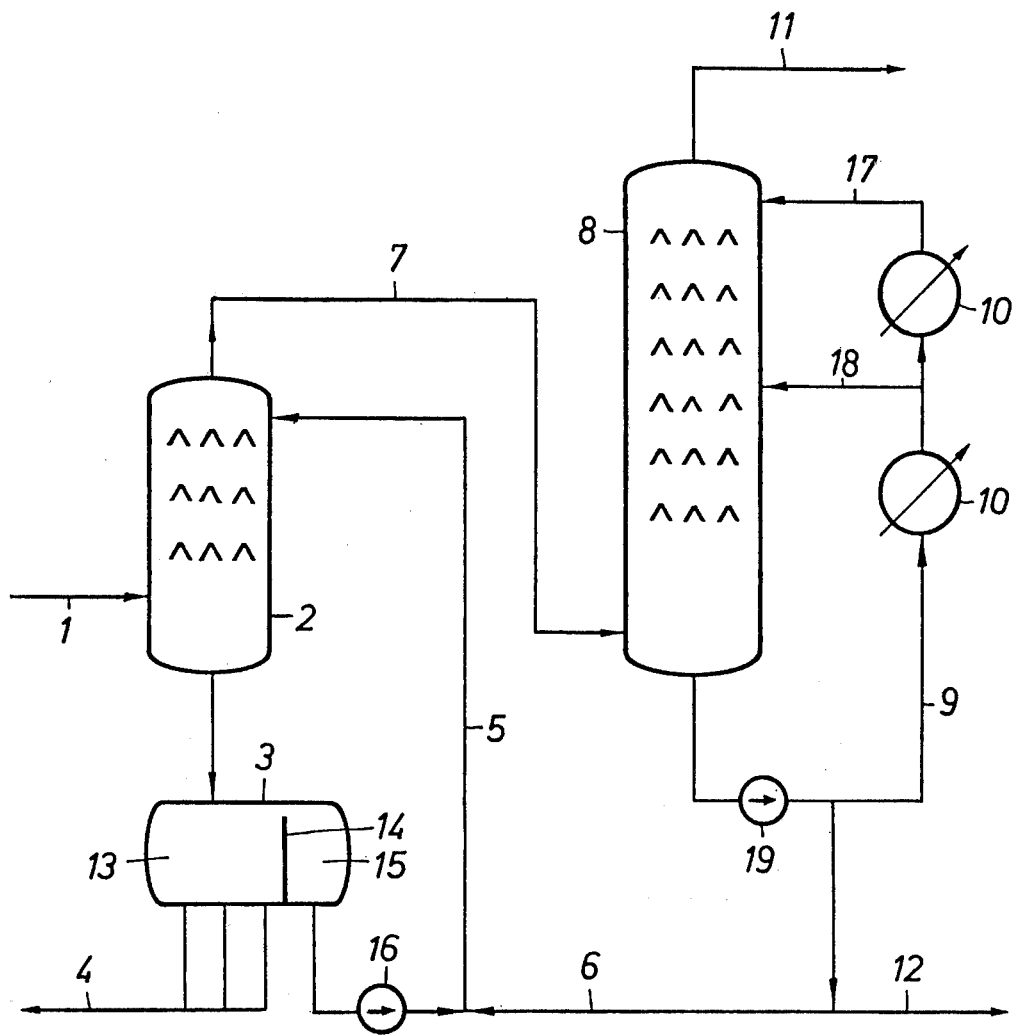

MULTISTAGE COOLING OF CRUDE HYDROCARBON GASES

BACKGROUND OF THE INVENTION

This invention relates to the cooling of crude gas mixtures containing hydrocarbons of a wide boiling point range, and especially to the cooling of cracked hydrocarbon gases, particularly to thermally cracked hydrocarbons.

In the thermal cracking of hydrocarbons, for example, a mixture predominating paraffinic hydrocarbons of 2-5 carbon atoms, a cracked gas is obtained at high temperatures, e.g., between 800° and 1000° C., said cracked gas consisting essentially of a broad spectrum of hydrocarbons having a wide boiling point range. References incorporated herein for a detailed description of thermal cracking are Ullmanns Encyklopaedie der technischen Chemie 4th edition, Volume b 1974, page 158 – 194, Verlag Chemie GmbH S. B. Edomik, E. J. Greem, C. P. Hallee: Manufacturing Ethylene, The Petroleum Publishing Co., 211 South Cheyenne, Tulsa, USA, reprinted from Oil Gas J. 1966 – 1970.

To avoid secondary reactions, the high temperature cracked gas is first quenched in so-called quenching or cracked-gas coolers to an intermediate temperature of about 250° to 400° C., for example about 350° C. Further cooling is not desirable since heavy hydrocarbon fractions are condensed which tend to polymerize and to form coke at the tube surface of the quench coolers. Therefore the cooling is limited to the temperatures stated above in order to obtain an economical heater and quench cooler run length.

The further cooling of this crude gas mixture, containing primarily hydrocarbons of 1-8 carbon atoms but also being contaminated with minor amounts of higher-boiling hydrocarbons, as well as coke and tar, to approximately ambient temperature is normally carried out in direct heat exchange with water in a suitable column. At the sump of such column there is obtained a mixture of water, liquid hydrocarbons, as well as tar and coke, and the mixture is then subjected to a water-separating step in a gravity-activated separator, e.g. a decanter. The thus-obtained water is recooled in one or more heat exchangers in indirect heat exchange with a refrigerant and then recycled to the column. A disadvantage of the above described cooling technique for the quenched gas is that the hydrocarbons cannot be completely separated from the water in the gravity-operated separator. As a consequence, the residual unseparated solid and liquid hydrocarbons in the water essentially cause the heat exchangers in the cooling cycle to be fouled and/or clogged. As a consequence, the heat exchangers must be frequently cleaned on the one hand, and the system must be provided with backup heat exchangers on the other hand. This results in increased operating and investment costs.

SUMMARY OF THE INVENTION

An object of the present invention is to provide an improved system for the cooling of a crude gas mixture, and especially to provide a process which avoids the fouling and/or clogging of heat exchangers.

Upon further study of the specification and appended claims, further objects and advantages of this invention will become apparent to those skilled in the art.

These objectives are attained, in accordance with this invention, by conducting the cooling step in at least two stages, wherein the cooling is effected in the first stage by the vaporization of water in direct contact and in the second stage by external refrigeration in indirect contact.

The temperature of the gas entering the first cooling stage is generally about 250° to 400° C., preferably 280° to 350° C.

It is possible by the process of this invention to prevent the deposition of condensed hydrocarbons and/or of solid impurities, such as tar and coke, on heat-transfer surfaces of heat exchangers, thereby resulting in substantially trouble-free operation. This is accomplished by condensing or scrubbing out the hydrocarbons and solid impurities, which would otherwise lead to the fouling of heat exchangers, in the first cooling stage wherein the cooling is effected by evaporating water. Since the cooling in the first cooling stage takes place in direct heat exchange with evaporating water, this process occurs practically adiabatically. Consequently, no external refrigeration need be supplied to the first cooling stage, which means that in the first stage it is unnecessary to provide indirect heat exchange surfaces, thereby eliminating the possibility of clogged heat exchangers in the first stage. The crude gas leaving the first exchange zone has about the following composition:

| COMPONENT | TYPICAL RANGE |
|---|---|
|  | (wt. %) |
| $CO + CO_2$ | .1 – .6 |
| $H_2$ | .5 – 4. |
| $CH_4$ | 5. – 25. |
| $CeH_2$ | .02 – .4 |
| $C_2H_4$ | 25. – 47. |
| $C_2H_6$ | 2.5 – 40. |
| $C_3H_6$ | 1.9 – 21. |
| $C_3H_8$ | .3 – 20. |
| $C_4$ | 2.0 – 10. |
| $C_5+$ | .5 – 12. |
| $H_2O$ | saturated |

The further cooling of the crude gas mixture to approximately ambient temperature, e.g. 15° to 45° C is then conducted in the second cooling stage with the use of external refrigeration, e.g. by way of a water cycle. In a water cycle, water is cooled in indirect heat exchange with an external refrigerant, e.g. ammonia, and is employed in direct heat exchange to further cool the crude gas mixture obtained from the first cooling stage. In the second cooling stage, conducted for example in a column provided with baffles or the like to improve the direct heat exchange between the refrigerated water and the gas, a mixture is obtained at the bottom of the column consisting essentially of cycle water, condensed water, and condensed hydrocarbons. This mixture is recooled by supplying external refrigeration thereto to a temperature of about 10° to 40° C. and then is recycled into the second cooling stage. Since all heavy hydrocarbons and/or impurities such as tar and coke have already been separated from the crude gas mixture in the first cooling stage, there is no longer any danger of clogging of the heat exchangers wherein the recycle water of the second cooling stage is cooled. Therefore, the heat exchangers for second stages can be designed for long performance without the necessity of expensive stand-by heat exchange capacity.

The crude gas is cooled in the first cooling stage to the dew point ($H_2O$) of the gas, generally about 85° to 98° C. In this way, the crude gas mixture leaving the first cooling stage is completely saturated with water, whereby maximum cooling in this cooling stage is ensured.

The amount of water fed to the first cooling stage is designed so that there is sufficient unvaporized liquid to efficiently scrubb out the solid impurities and the condensed heavy hydrocarbons in this stage. These undesired components can then be separated from the scrubbing water at least partially in a continuous decanter, for example, so that the water can be recycled into the first cooling stage. In general, about 5 to 25%, preferably 10 to 15% of the incoming water is vaporized in the first cooling stage.

In accordance with a further feature of the invention, make-up water for the first cooling stage can be provided by diverting water from the water cycle of the second cooling stage.

The invention is especially applicable to the cooling of gases having the same % by weight composition of hydrocarbons (without water) as indicated in the table above.

BRIEF DESCRIPTION OF DRAWING

The attached FIGURE is a schematic flowsheet of the preferred embodiment of the invention.

DETAILED DESCRIPTION OF DRAWING

According to the FIGURE, a crude gas mixture to be treated, containing primarily hydrocarbons of 1-8 carbon atoms but also containing several higher-boiling hydrocarbons, as well as solid impurities, such as tar and coke, is fed to the cooling system of this invention at a temperature of about 320° C. by way of a conduit 1 and is introduced into a first water contact column 2. In this column 2, corresponding to a first cooling stage, the crude gas mixture is cooled in direct heat exchange with evaporating water fed to the column 2 by way of a conduit 5. Owing to the cooling action, a portion of the heavy hydrocarbons is condensed out of the crude gas mixture and is collected in the lower zone of column 2 together with the solid impurities, such as tar and coke which are scrubbed out by unvaporized water.

From the lower zone of column 2, the mixture of water, liquid hydrocarbons, and solid impurities is fed to a gravity-operated separator 3 wherein the largest portion of the water is again separated from the mixture. While the hydrocarbons as well as the impurities are withdrawn via a conduit 4 from a first chamber 13 of the gravity-operated separator 3, the water flows via a weir 14 into a second chamber 15 and is recycled into the water contact column 2 by means of a pump 16 via the conduit 5. Since the cooling is effected in column 2 by evaporating water, i.e. practically adiabatically, in other words without the supply of external refrigeration, no additional heat exchangers are required to cool the recirculated water. Consequently, there are no heat-transfer surfaces which can be clogged by heavy hydrocarbons and solid impurities may be still contained in the water recirculated via conduit 5 due to the relatively incomplete separation in the gravity-operated separator 3.

For purposes of additional cooling, the crude gas mixture obtained in the head of the water contact column 2 at a temperature of about 90° C. and now saturated with water is fed via a conduit 7 to a second water contact column 8. In this second cooling stage, the cooling step is again conducted in direct heat exchange, but this time, with recirculated water which is cooled in heat exchangers 10 in indirect heat exchange with a refrigerant and is then fed into the water contact column 8 by way of conduits 17 and 18.

The water in conduit 18 has a temperature of about 50° to 65° C., and the water in conduit 17 a temperature of about 10° to 40° C.

A two stage cooling circuit is normally used in order to obtain a closer temperature approach of the circuit water to the cooled cracked gas in the quench tower and to increase the water circulation in the tower to obtain an efficient scrubbing action in the tower.

In the sump of column 8, there is obtained a mixture of water and liquid hydrocarbons, which is partially recycled through the heat exchangers 10 via conduit 9 by means of a pump 19. Another portion, e.g. 1 to 2%, is fed to the first water contact column 2 via a conduit 6 to provide make-up water, whereas the remainder, about 2 to 4%, is withdrawn from the plant for reprocessing via a conduit 12.

Due to the fact that, in the first water contact column 2, all heavy hydrocarbons as well as the solid impurities have already been separated from the crude gas mixture, the heat exchangers 10 in the water cycle of the second water quenching column 8 will not be clogged as in the past so that these heat exchangers can be designed as simple structures, i.e. without replacement units.

The thus-cooled crude gas mixture is withdrawn via a conduit 11 from the head of the second water contact column 8 at a temperature of about 35° C.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for cooling a crude gas containing a mixture of hydrocarbons having divergent boiling points, comprising the steps of
    a. cooling said crude gas in a first stage in direct heat exchange with water to scrub out thus-condensed hydrocarbons and solids, said cooling being conducted substantially adiabatically by vaporization of the water, the resultant cooled crude gas being cooled to above the ambient temperature of the gas; and
    b. further cooling resultant cooled gas from said first stage in a second stage to about ambient temperature, said further cooling being provided by an external refrigerant.

2. A process according to claim 1, wherein the crude gas mixture in the first stage is cooled to the temperature of the water dew point.

3. A process according to claim 1, wherein said further cooling in the second stage is conducted by direct heat exchange with refrigerated water, and a mixture of condensed hydrocarbons and warmed water is obtained.

4. A process according to claim 3, wherein a mixture of water, liquid hydrocarbons, and solid impurities is obtained from the scrubbing action in the first stage and said mixture is separated into a fraction enriched in hydrocarbons and impurities and into a fraction enriched in water, and the water-enriched fraction, together with a portion of the mixture of warmed water and condensed hydrocarbons obtained in the second cooling stage, is recycled into the first stage.

5. A process according to claim 1, wherein the crude gas fed to said first stage is a cracking gas having a temperature of about 250° to 400° C.

6. A process according to claim 2, wherein the crude gas fed to said first stage is a cracking gas having a temperature of about 250° to 400° C., and wherein said further cooling in the second stage is conducted by direct heat exchange with refrigerated water, and a mixture of condensed hydrocarbons and warmed water is obtained.

7. A process according to claim 6, wherein a mixture of water, liquid hydrocarbons and solid impurities is obtained from the scrubbing action in the first stage and said mixture is separated into a fraction enriched in hydrocarbons and impurities and into a fraction enriched in water, and the water-enriched fraction, together with a portion of the mixture of warmed water and condensed hydrocarbons obtained in the second cooling stage, is recycled into the first stage.

* * * * *